United States Patent
Schick et al.

(10) Patent No.: US 7,088,829 B1
(45) Date of Patent: Aug. 8, 2006

(54) METHOD AND APPARATUS FOR PRODUCING SOUNDS THAT DEPEND ON THE OPERATION OF AN INTERNAL COMBUSTION ENGINE IN THE INTERIOR SPACE OF A MOTOR VEHICLE

(75) Inventors: Bernhard Schick, Tegernbach (DE); Herbert Dormeier, Germering (DE); Helmut Spannheimer, Neukeferloh (DE); Bernd Lischo, Dorfen (DE); Raymond Freymann, München (DE)

(73) Assignees: TUV Automotive GmbH (DE); Bayerische Motorenwerke AG (DE)

( * ) Notice: Subject to any disclaimer, the term of this patent is extended or adjusted under 35 U.S.C. 154(b) by 0 days.

(21) Appl. No.: 09/744,096

(22) PCT Filed: Jul. 13, 1999

(86) PCT No.: PCT/EP99/04953

§ 371 (c)(1), (2), (4) Date: Mar. 5, 2001

(87) PCT Pub. No.: WO00/04532

PCT Pub. Date: Jan. 27, 2000

(30) Foreign Application Priority Data

Jul. 14, 1998 (DE) .................................. 198 31 576

(51) Int. Cl. *G10K 11/16* (2006.01)

(52) U.S. Cl. ......................... 381/71.4; 381/86; 381/61

(58) Field of Classification Search ............... 381/71.5, 381/71.4, 71.13, 71.14, 86, 61; 181/224, 181/228

See application file for complete search history.

(56) References Cited

U.S. PATENT DOCUMENTS

| 4,002,155 A | * | 1/1977 | Harned et al. | ......... 123/406.39 |
| 4,446,724 A | * | 5/1984 | Focht | ......................... 73/35.01 |
| 5,168,192 A | * | 12/1992 | Kosugi et al. | ............... 310/338 |
| 5,209,122 A | * | 5/1993 | Matly et al. | ................... 73/727 |

(Continued)

FOREIGN PATENT DOCUMENTS

DE 44 42 233 6/1995

(Continued)

OTHER PUBLICATIONS

International Search Report PCT/EP99/04953 Jul. 13, 1999.

*Primary Examiner*—Stella Woo
(74) *Attorney, Agent, or Firm*—Robert W Becker & Associates; Robert W Becker

(57) ABSTRACT

An apparatus for producing sounds corresponding to the operation of an internal combustion engine in the interior space of a motor vehicle is characterized by a pressure sensor (20) that detects fluctuations in pressure in a fresh air stream into the engine, an amplification device (32, 33) for amplifying output signals of the pressure sensor, and at least one speaker (34) attached to the amplifier and arranged in the interior space of the vehicle for reproducing the amplified signals.

20 Claims, 2 Drawing Sheets

U.S. PATENT DOCUMENTS

| | | | |
|---|---|---|---|
| 5,237,617 A | | 8/1993 | Miller |
| 5,371,802 A | * | 12/1994 | McDonald et al. ............ 381/61 |
| 5,384,855 A | * | 1/1995 | Kwang ......................... 381/86 |
| 5,571,239 A | | 11/1996 | Kameda et al. |
| 5,635,903 A | * | 6/1997 | Koike et al. ................... 381/86 |
| 5,692,052 A | | 11/1997 | Tanaka et al. |
| 5,820,442 A | * | 10/1998 | Helder ......................... 381/61 |
| 5,835,605 A | * | 11/1998 | Kunimoto .................... 381/61 |
| 5,850,458 A | | 12/1998 | Tomisawa et al. |
| 6,275,590 B1 | * | 8/2001 | Prus ............................ 381/61 |
| 6,356,185 B1 | * | 3/2002 | Plugge et al. ................. 381/61 |

FOREIGN PATENT DOCUMENTS

| | | |
|---|---|---|
| DE | 196 10 292 | 9/1996 |
| DE | 197 01 801 A1 | 2/1998 |
| DE | 196 43 030 | 4/1998 |
| JP | 08-246969 | 9/1996 |
| WO | WO 90/13109 | 11/1990 |
| WO | WO 91/18385 | 11/1991 |

* cited by examiner

METHOD AND APPARATUS FOR PRODUCING SOUNDS THAT DEPEND ON THE OPERATION OF AN INTERNAL COMBUSTION ENGINE IN THE INTERIOR SPACE OF A MOTOR VEHICLE

BACKGROUND OF THE INVENTION

The present invention relates to a method and an apparatus for producing sounds corresponding to the operation of an internal combustion engine in the interior space of a motor vehicle.

Ever increasing limits for external vehicle noise, increasing demand for luxury for vehicle occupants, and technological progress have led to a situation in modern motor vehicles, especially passenger cars, in which engine noise and other acoustic indicators of driving status, such as velocity, acceleration, etc., are now nearly inaudible. The undesired by-product of the positive results of this reduction in interior noise is that the subjective perception of speed and/or acceleration are distorted for the vehicle occupants, especially for the driver. This distorted perception can lead to faulty assessments of risk, which can have safety implications.

The object of the present invention is to solve this problem and to provide the driver a realistic subjective perception of the current driving conditions, even in luxurious vehicles having excellent noise suppression.

SUMMARY OF THE INVENTION

The method of the present invention provides for detecting fluctuations in pressure in the fresh air stream supplied to the engine, wherein such fluctuations are caused by the intake of the cylinder or cylinders of the engine, by converting such fluctuations into signals, and by making the signals audible via at least one speaker disposed in the interior space of the motor vehicle.

The apparatus for realizing the object of the invention comprises a pressure sensor for detecting fluctuations in pressure in a fresh air stream to the engine, wherein such fluctuations are caused by an intake of the cylinder or cylinders of the engine, an amplification device for amplifying the output signals of the pressure sensor, and at least one speaker that is disposed in the interior vehicle space and is connected to the amplification device for reproducing amplified output signals.

The apparatus in accordance with the invention is advantageously further developed with the features discussed in detail subsequently.

Surprisingly, it has been determined that making audible fluctuations in pressure in the fresh air stream or fresh air charge stream forwarded to the engine imparts to the driver acoustic information about speed, load, and torque, that is, about the operating conditions of the engine, which determine the driving condition of the vehicle.

Another advantage obtained with the invention is that using the method in accordance with the invention, or the apparatus in accordance with the invention, in the interior space produces a sound that is perceived as pleasant.

Converting fluctuations in pressure in the fresh air steam into acoustic signals is extremely simple and requires neither highly complicated multisensors nor complex signal processes.

BRIEF DESCRIPTION OF THE DRAWINGS

The invention is explained in more detail in the following with respect to schematic drawings, in which.

DESCRIPTION OF PREFERRED EMBODIMENTS

Figure 1:
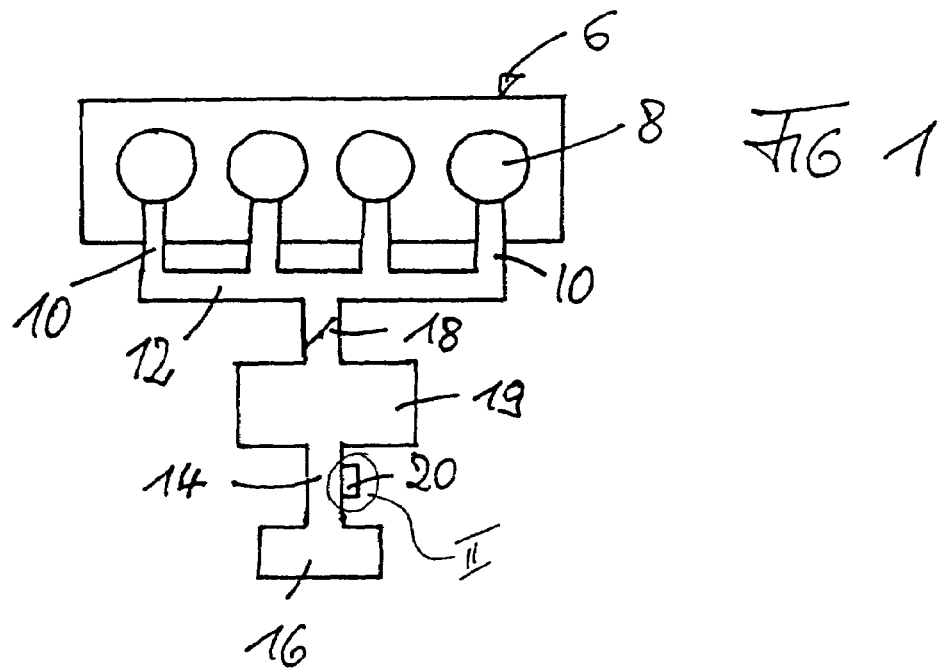
FIG. 1 is a schematic of the intake system of a four-cylinder internal combustion engine.

In accordance with FIG. 1, an internal combustion engine 6 has four cylinders 8 to which fresh air to fresh air charge is supplied via individual intake pipes 10. The individual intake pipes 10 are interconnected via a distributor pipe 12 that is attached via an intake manifold 14 to an air filter 16. Provided for controlling output is a throttle or butterfly valve 18 that a diesel motor lacks and for which another type of output control member can be substituted. An air collector 19 can be interposed between the throttle valve 18 and the air filter 16.

Arranged advantageously upstream of the throttle valve 18 on the air collector 19 or between the air collector and the air filter 16 is a pressure sensor 20 that detects the fluctuations in pressure of the fresh air stream or fresh air charge supplied to the cylinders 8.

Figure 2:
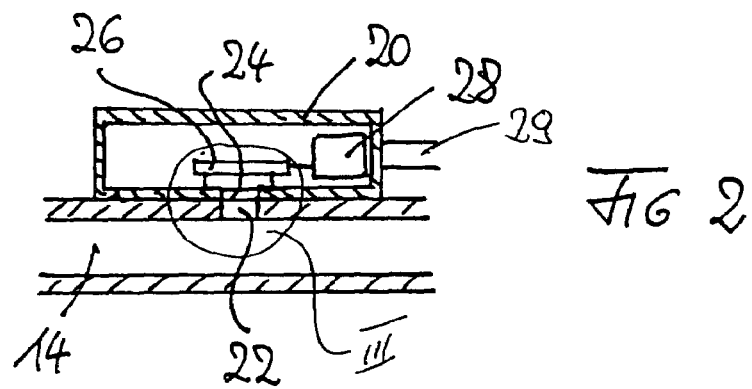
FIG. 2 is Section II from FIG. 1.

FIG. 2 illustrates an enlarged section of FIG. 1.

In accordance with FIG. 2, in its wall the intake manifold 14 has a hole 22 that is aligned with a pressure-sensitive input window 24 of the pressure sensor 20. The pressure sensor 20 is affixed to the intake manifold 14 in a manner known per se, for example with screws or adhesive, whereby the input window 24 advantageously is directly adjacent to the hole 22. Arranged in the interior of the pressure sensor 20 is a pressure-sensitive component 26, for example a piezo element, that is connected via electronics 28 to outputs 29.

The pressure sensor 20 detects fluctuations in pressure at the hole 22. The pressure-sensitive component 26 is therefore embodied and arranged such that it reacts to these fluctuations in pressure. It can be embodied as an absolute pressure sensor. Since the absolute pressure in this case is not of essential importance, but rather the issue is detecting fluctuations in pressure, the component 26 is advantageously embodied as a differential pressure sensor that detects the difference between the pressure at its front side, i.e. the pressure in the hole 22, and the pressure at its rear side, whereby the pressure at the rear side is advantageously the ambient air pressure.

Furthermore, the pressure sensor 20 advantageously has a broad frequency range of, for example, 1 Hz to 10 kHz, and is temperature-compensated. Such a pressure sensor is employed, for example, in doors of motor vehicles as sidecrash collision sensors and can be obtained commercially as a product called the Siemens Pressure Satellite for Sidecrash Tests, EBM 16.

The pressure sensor 20 is advantageously highly dynamic, whereby its broad frequency range ensures that steep ascending or descending edges in the stochastic pressure signals can be detected with no problem. The pressure sensor detects almost no structure-borne noise via the connection.

Figure 3:
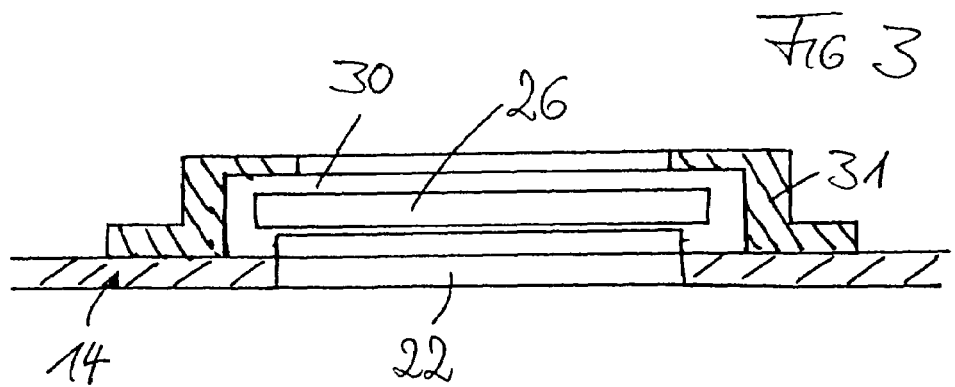
FIG. 3 is Section III from FIG. 2.

FIG. 3 illustrates an example. The pressure-sensitive component 26 is a piezo element that reacts to changes in the difference in pressure acting on its ends with changes in the electrical voltage between its ends. The disk-shaped component 26 is received hermetically sealed in an elastomer sheath 30 that at its end that faces the hole 22 is embodied as a thin diaphragm that opposes the fluctuations in pressure with practically no resistance. The sheath 30 together with the component 26 is received in a mount 31 that is affixed to the intake manifold 14. Structure-borne noise is not picked up, at least in the frequency ranges of interest, due to the appropriate embodiment of the sheath 30 and, if necessary, additional parts between that of the manifold wall and the component 26. Furthermore, the connection of the component 26 to the wall of the manifold is such that structure-borne noise causes almost no excitation, in contrast to large surface area excitation due to fluctuations in air pressure.

It is to be understood that it is also possible to have other connections of pressure-sensitive components or to use other pressure-sensitive components, such as diaphragms, pressure-sensitive resistors, etc. When the back side of the component 30 in FIG. 3 is adjacent along its entire surface to the mount, which is then embodied closed, the component 26 is an absolute pressure sensor. Operating characteristics can be influenced depending on the size of the opening on the back side in the mount 31 and the connection to the ambient pressure and/or manifold pressure.

Figure 4:
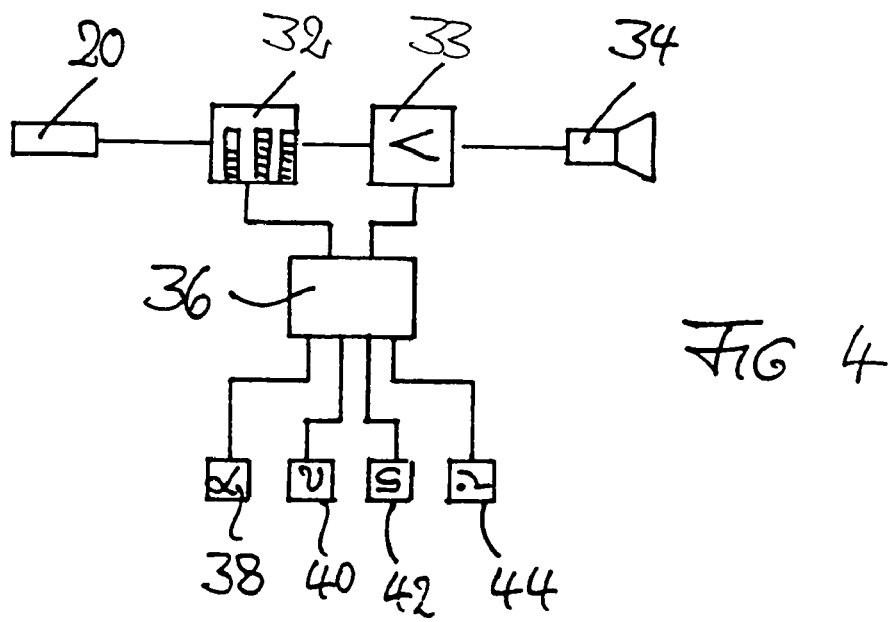
FIG. 4 is a block diagram of the apparatus in accordance with the invention; and, FIG. 5 is a detail of a block diagram that has been modified with respect to FIG. 4.

FIG. 4 illustrates a block diagram of the arrangement. Downstream of the sensor 20 is a filter device 32, which itself is upstream of an amplifier 33, the output of which is connected to a speaker 34.

The frequency response of the filter device 32 is determined by a modulation device 36 that can also be used to change the amplification factor of the amplifier 33. Inputs to the modulation device 36 are connected to a sensor 38 for detecting the position of an output control member, a sensor 40 for detecting vehicle speed, a sensor 42 for detecting a switch lever position, and a switch 44. The structures of the filter device 32, the amplifier 33, the modulation device 36, and the sensors 38, 40, and 42 are known per se and will therefore not be explained in greater detail.

The apparatus described functions as follows:

The charge stream through the intake manifold 14 fluctuates corresponding to excitation from the engine. The fluctuations in pressure in the stream in the intake manifold 14 are detected by means of the pressure sensor 20 and, due to the high sensitivity and dynamics of the pressure sensor, are converted into output signals that reproduce the fluctuations in the intake or pressure. These fluctuations in pressure contain immediate information about the speed and load under which the engine is running, whereby the load information is extremely dynamic, especially in the arrangement in accordance with FIG. 1 in which the pressure sensor 20 is disposed upstream of the throttle valve 20. The output signal of the pressure sensor 20 is processed in the filter device 32 and amplified in the amplifier 33 and then reproduced by the speaker 34.

Advantageously, the filter device 32 dampens frequencies greater than 300 Hz, which leads to a pleasant sound that is not distorted by interfering overlaid sounds. Hum frequencies below 30 Hz or 30 to 40 Hz are also suppressed so that no subjectively unpleasant noises are produced. Such a filter device is simple and is therefore cost-effective to produce.

In this manner a sound can be produced that corresponds to the operation of the engine and that is subjectively perceived as direct engine noise, even in vehicle interiors that are sound-proofed extremely well and in which wind noise, trend noise, etc., etc., cannot be heard, and can provide the driver information about the driving status of the vehicle or the output of the engine, permitting the driver to come to a realistic assessment thereof.

The frequency response of the filter device 32 can be matched to the vehicle.

It can be useful to link the frequency response of the filter device 32 to the position of the accelerator, the vehicle speed, and/or the gearshift lever of a transmission by means of the modulation device 36. Similarly, the amplification factor of the amplifier 33 can depend on these parameters. For instance, when the gearshift lever is in a sport position, the frequency spectrum can be slightly elevated and the amplification factor can be increased at greater speeds or when the output control member position increases. Different sound characteristics can be set by means of the switch 44.

For many applications it is advantageous to influence the engine noise transmitted over the speaker 34 not only by increasing and decreasing its frequency portions, but also to actively change them in that the noise characteristics of a six-cylinder engine are produced from the noise characteristics of a four-cylinder engine, for example using frequency multiplication by a factor of 1.5 and shaping the frequency portions.

Figure 5:
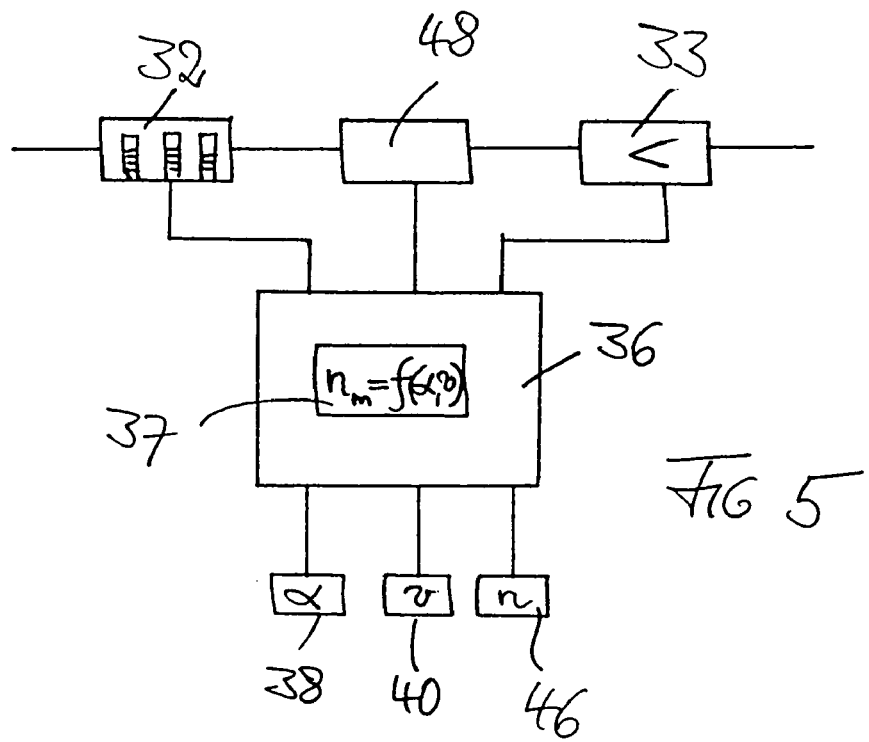

FIG. 5 illustrates a modified detail of the block diagram.

In a vehicle equipment with a CVT (continuous variable transmission), there is an effect that the driver is not accustomed to and that is disadvantageous in terms of assessing the current driving speed in that the engine speed is largely independent of driving speed. In the embodiment in FIG. 5, the modulation device 36 contains a storage means for performance characteristic in which a speed characteristic is stored in which the current engine speed corresponding to a conventional drive train, provided for example with a graduated automatic transmission, is stored depending on the position of the accelerator and the vehicle speed. The actual speed is detected by a speed sensor 46 so that any frequency multiplication factor can be calculated that is forwarded to an active module 48. In this manner the engine noise of a CVT vehicle that can be perceived in the interior space can be adapted to that of a conventional vehicle.

Information about engine operation that is important to the driver can be imparted in a cost-effective manner using the present invention (mass-produced components can be employed). The intake fluctuation contains information about speed and torque that is highly dynamic, especially when detected upstream of a throttle valve, since, for example when idling or when the vehicle is rolling or being pushed, the throttle valve smooths the dynamics in the distributor 12 so that there are only minor fluctuations in the intake manifold 14, which fluctuations increase sharply as the throttle opens more and more.

The apparatus described can be modified in numerous ways. Very different, highly dynamic pressure sensors can be employed. The pressure sensor can be arranged immediately inside the intake manifold, at the collector 19, or somewhere else such that it detects fluctuations in intake pressure. It is also possible to arrange the pressure sensor upstream of the air filter 16. The apparatus described can be integrated into the sound system in a motor vehicle, whereby modern radio equipment already contains amplifiers that automatically adapt the amplification factor to vehicle speed.

What is claimed is:

1. An apparatus comprising:
    a pressure sensor arranged and constructed to detect pressure fluctuations inside an air intake conduit that is in communication with an engine of a vehicle, the pressure sensor generating pressure fluctuation signals,
    an amplifier in communication with the pressure sensor and being arranged and constructed to amplify said pressure fluctuation signals, thereby generating signals representative of the sound of said vehicle engine, and
    at least one speaker coupled to the output of said amplifier so as to make said amplified pressure fluctuation signals audible inside a cabin of the vehicle.

2. An apparatus as in claim 1, wherein the pressure sensor comprises a piezoelectric element.

3. An apparatus as in claim 2, wherein the pressure sensor has a frequency range of about 1 Hz to 10 kHz.

4. An apparatus as in claim 3, further comprising:
    a filter disposed between the pressure sensor and the amplifier, and
    a modulator arranged and constructed to adjust the frequency range of the filter.

5. An apparatus as in claim 4, wherein the modulator is also arranged and constructed to adjust the amplification factor of the amplifier.

6. An apparatus as in claim 1, wherein the pressure sensor is connected to an inner wall of an intake manifold and is disposed upstream of a throttle valve.

7. An apparatus as in claim 6, wherein the pressure sensor is a differential pressure sensor and the pressure sensor has an input window that is mounted adjacent to a hole defined in the intake manifold.

8. A method comprising:
    detecting pressure fluctuations inside an air intake conduit, which is in communication with an engine of a vehicle, using a pressure sensor, wherein the pressure sensor generates pressure fluctuation signals,
    amplifying said pressure fluctuation signals and
    supplying the amplified pressure fluctuation signals to at least one speaker disposed inside a cabin of the vehicle, whereby the at least one speaker outputs sounds representative of the noise of said vehicle engine.

9. A method as in claim 8, wherein the amplifying step further comprises
    frequency-selective filtering said pressure fluctuation signals generated by the pressure sensor, and
    modulating said pressure fluctuation signals based upon operational parameters of the vehicle.

10. A method as in claim 9, further comprising attenuating frequencies above 300 Hz.

11. A method as in claim 8, wherein the pressure fluctuations are detected by the pressure sensor upstream of a throttle valve.

12. A method as in claim 8, wherein the pressure sensor is a differential pressure sensor.

13. A method as in claim 12, wherein the differential pressure sensor is a piezoelectric element.

14. A method as in claim 13, wherein the piezoelectric element has a frequency range of about 1 Hz to 10 kHz.

15. An apparatus comprising:
    a piezoelectric sensor disposed in an intake manifold in communication with a vehicle engine, wherein if the vehicle engine has a throttle valve, the piezoelectric sensor is disposed upstream of the throttle valve, and wherein the piezoelectric sensor is arranged and constructed to generate signals based upon detected pressure fluctuations, which signals emulate the noise of said vehicle engine,
    an amplification circuit arranged to amplify said engine noise signals and
    at least one speaker arranged and constructed to receive the amplified signals and being disposed so as to make engine sounds audible inside a cabin of the vehicle.

16. An apparatus as in claim 15, further comprising:
    a filter is disposed between the pressure sensor and the amplification circuit, and
    a modulator arranged and constructed to adjust the frequency range of the filter and to adjust the amplification gain of the amplification circuit,
    wherein the piezoelectric sensor is a differential sensor having a frequency range of about 1 Hz to 10 kHz and is connected to an inner wall of the intake manifold.

17. An apparatus as in claim 15, wherein the vehicle engine has the throttle valve, the pressure sensor is arranged and constructed to generate pressure fluctuation signals that are the source of said engine sound to be made audible inside the cabin of the vehicle and said engine sounds are representative of said vehicle engine.

18. A method comprising:
    detecting pressure fluctuations inside an air intake manifold, which is in communication with an engine of a vehicle, using a piezoelectric sensor, wherein if the vehicle engine has a throttle valve, the piezoelectric sensor is disposed upstream of the throttle valve, and wherein the piezoelectric sensor generates signals that emulate the noise of the vehicle engine, and
    amplifying said engine noise signals and
    supplying the amplified signals to at least one speaker disposed inside a cabin of the vehicle, wherein the at least one speaker outputs sound representative of the engine noise.

19. A method as in claim 18, wherein the amplifying step further comprises:
    frequency-selective filtering said engine noise signals and modulating said engine noise signals based upon operational parameters of the vehicle.

20. A method as in claim 18, wherein the vehicle engine has the throttle valve, the pressure sensor generates pressure fluctuation signals that are the source of said engine noise that is made audible inside the cabin of the vehicle and said engine noise is representative of said vehicle engine.

* * * * *